US009604612B2

(12) United States Patent
Sekiya et al.

(10) Patent No.: US 9,604,612 B2
(45) Date of Patent: Mar. 28, 2017

(54) BRAKE HYDRAULIC PRESSURE CONTROL DEVICE FOR VEHICLE

(71) Applicants: NISSIN KOGYO CO., LTD., Ueda-Shi, Nagano (JP); HONDA MOTOR CO., LTD., Minato-Ku, Tokyo (JP)

(72) Inventors: Tomoaki Sekiya, Ueda (JP); Shigehiro Honda, Wako (JP); Ryosuke Ueda, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 14/346,455

(22) PCT Filed: Sep. 27, 2012

(86) PCT No.: PCT/JP2012/074915
§ 371 (c)(1),
(2) Date: Mar. 21, 2014

(87) PCT Pub. No.: WO2013/047670
PCT Pub. Date: Apr. 4, 2013

(65) Prior Publication Data
US 2014/0236447 A1 Aug. 21, 2014

(30) Foreign Application Priority Data

Sep. 28, 2011 (JP) .................. 2011-213073

(51) Int. Cl.
*B60T 8/1763* (2006.01)
*B60T 8/1764* (2006.01)
(52) U.S. Cl.
CPC ........ *B60T 8/17636* (2013.01); *B60T 8/1764* (2013.01)

(58) Field of Classification Search
CPC ........................... B60T 8/17636; B60T 8/1764
See application file for complete search history.

(56) References Cited

U.S. PATENT DOCUMENTS 4,662,686 A  5/1987 Matsuda
5,388,896 A  2/1995 Hartmann et al.
(Continued)

FOREIGN PATENT DOCUMENTS

DE  3925828 A1  2/1991
JP  S59-209943 A  11/1984
(Continued)

OTHER PUBLICATIONS

Official Communications dated Feb. 10, 2015 issued in the corresponding European Application No. EP 12 83 5710.

*Primary Examiner* — Redhwan K Mawari
*Assistant Examiner* — Alan D Hutchinson
(74) *Attorney, Agent, or Firm* — Carrier Blackman & Associates, P.C.; William D. Blackman; Jingli Wang (57) ABSTRACT

A brake hydraulic pressure control device for a vehicle in which operation of a hydraulic pressure adjustment unit that can carry out adjustment involving individually increasing/decreasing brake hydraulic pressures applied to wheel brakes for front and rear wheels is controlled for allowing differential pressure between brake hydraulic pressures of the left and right wheel brakes, wherein allowable differential pressure setting means is arranged for setting the allowable differential pressure corresponding to the coefficient of friction of a road surface, hydraulic pressure acquisition means acquires a lock hydraulic pressure, which is a hydraulic pressure when starting anti-lock brake control for the respective wheel brake, and when the lock hydraulic pressure of the wheel brakes for the front wheels acquired by the hydraulic pressure acquisition means is no greater than a predetermined value, application of the allowable differen- (Continued)

tial pressure corresponding to the coefficient of friction of the road surface is prohibited.

8 Claims, 7 Drawing Sheets

(56) References Cited

U.S. PATENT DOCUMENTS

| | | | |
|---|---|---|---|
| 6,044,319 A * | 3/2000 | Rosendahl et al. | 701/71 |
| 7,661,772 B2 * | 2/2010 | Heinemann | 303/146 |
| 7,775,608 B2 | 8/2010 | Schmidt et al. | |
| 2007/0029875 A1 * | 2/2007 | Kurosaki | B60T 8/1764 |
| | | | 303/187 |

FOREIGN PATENT DOCUMENTS

| | | |
|---|---|---|
| JP | H03-82658 A | 4/1991 |
| JP | H06-87419 A | 3/1994 |
| JP | H06-107156 A | 4/1994 |
| JP | H06-156248 A | 6/1994 |
| JP | 2002-012136 A | 1/2002 |
| JP | 2007-055583 A | 3/2007 |
| JP | 2007-515347 A | 6/2007 |

* cited by examiner

BRAKE HYDRAULIC PRESSURE CONTROL DEVICE FOR VEHICLE

TECHNICAL FIELD

The present invention relates to a brake hydraulic pressure control device for a vehicle, the device including a hydraulic pressure adjustment unit that can carry out adjustment involving individually increasing/decreasing brake hydraulic pressures applied to wheel brakes for front wheels and wheel brakes for rear wheels in order to prevent the front wheels and the rear wheels from attaining a locked state when braking, and allowable differential pressure setting means that sets an allowable differential pressure between the brake hydraulic pressures of the wheel brakes for the left and right front wheels and an allowable differential pressure between the brake hydraulic pressures of the wheel brakes for the left and right rear wheels, operation of the hydraulic pressure adjustment unit being controlled so that the differential pressure between brake hydraulic pressures of the left and right wheel brakes is no greater than an allowable differential pressure that is set by the allowable differential pressure setting means.

BACKGROUND ART

A brake hydraulic pressure control device for a vehicle in which anti-lock brake control is carried out independently for coaxial wheel brakes for left and right front wheels and rear wheels is known from Patent Document 1; in this arrangement, an allowable differential pressure that is selected from allowable differential pressures calculated from vehicle speed, lateral acceleration, and hydraulic pressure of the wheel brakes for the coaxial wheels is set by allowable differential pressure setting means so that a differential pressure that is greater than the allowable differential pressure does not occur for brake hydraulic pressure of the coaxial wheel brakes for left and right front wheels and rear wheels.

RELATED ART DOCUMENTS

Patent Document

Patent Document 1: Japanese Patent Application Laid-open No. 2007-55583

SUMMARY OF THE INVENTION

Problems to be Solved by the Invention

As in the arrangement disclosed by Patent Document 1 above, when the brake hydraulic pressures of the left and right wheel brakes are independently controlled so that the differential pressure between the brake hydraulic pressures of the left and right wheel brakes is less than an allowable differential pressure, it is necessary to carry out control appropriately according to road surface conditions such as the road surface having a low coefficient of friction while taking into consideration vehicle behavioral stability.

The present invention has been accomplished in light of such circumstances, and it is an object thereof to provide a brake hydraulic pressure control device for a vehicle that can independently control the brake hydraulic pressure of left and right wheel brakes according to road surface conditions.

Means for Solving the Problems

In order to attain the above object, according to a first aspect of the present invention, there is provided a brake hydraulic pressure control device for a vehicle, the device including an anti-lock hydraulic pressure adjustment unit that is configured to carry out adjustment involving individually increasing/decreasing brake hydraulic pressures applied to wheel brakes for front wheels and wheel brakes for rear wheels in order to prevent the front wheels and the rear wheels from attaining a locked state when braking, and allowable differential pressure setting means that sets a first allowable differential pressure between the brake hydraulic pressures of the wheel brakes for the left and right front wheels and a second allowable differential pressure between the brake hydraulic pressures of the wheel brakes for the left and right rear wheels, operation of the anti-lock hydraulic pressure adjustment unit being controlled so that a maximum applied differential pressure between brake hydraulic pressures of the left and right wheel brakes is no greater than the first or second allowable differential pressure that is set by the allowable differential pressure setting means, characterized in that the device comprises hydraulic pressure acquisition means that acquires a lock hydraulic pressure, which is a hydraulic pressure when starting anti-lock brake control for the respective wheel brake, wherein the allowable differential pressure setting means sets the first and second allowable differential pressures by selecting a maximum among three components including a vehicle body speed component, determined according to an estimated vehicle body speed, a lateral acceleration component determined according to a sensed lateral acceleration, and a coefficient of friction component determined according to a coefficient of friction of a road surface on which the vehicle is traveling, during normal operating conditions, the allowable differential pressure setting means being arranged so that the first allowable differential pressure can be set so as to correspond to a coefficient of friction of a road surface, and during low-friction road conditions, when the lock hydraulic pressure of the wheel brakes for the front wheels acquired by the hydraulic pressure acquisition means is no greater than a predetermined value which can be determined as to be a low coefficient of friction, the allowable differential pressure setting means sets the first allowable differential pressure by selecting a larger value between the vehicle body speed component and the lateral acceleration component.

Further, according to a second aspect of the present invention, in addition to the first aspect, when the lock hydraulic pressure of the wheel brake for either one of the left and right front wheels acquired by the hydraulic pressure acquisition means is no greater than the predetermined value, application of the allowable differential pressure corresponding to the coefficient of friction of the road surface is prohibited.

According to a third aspect of the present invention, in addition to the first or second aspect, application of the allowable differential pressure corresponding to the coefficient of friction of the road surface at least to the wheel brakes for the rear wheels is prohibited based on the lock hydraulic pressure of the wheel brakes for the front wheels acquired by the hydraulic pressure acquisition means.

Moreover, according to a fourth aspect of the present invention, in addition to any one of the first to third aspects, the hydraulic pressure acquisition means starts acquisition of lock hydraulic pressure when starting to increase pressure in the first cycle of anti-lock brake control.

Effects of the Invention

In accordance with the first aspect of the present invention, since whether the road surface on which the vehicle is traveling has a low coefficient of friction is determined from the lock hydraulic pressure of the wheel brakes for the front wheels, which is less susceptible to the vehicle load state, and in this state application of an allowable differential pressure corresponding to the coefficient of friction of the road surface is prohibited, it is possible to appropriately set an allowable differential pressure according to the state of the road surface.

Furthermore, in accordance with the second aspect of the present invention, since application of the allowable differential pressure corresponding to the coefficient of friction of the road surface is prohibited by determining that the coefficient of friction of the road surface is low when the lock hydraulic pressure of the wheel brake of either of the left and right front wheels is the predetermined value or below, this enables the arrangement to be such that an allowable differential pressure corresponding to the coefficient of friction of the road surface is not applied other than in a state in which the road surfaces with which the left and right front wheels are in contact both have a high coefficient of friction, thereby permitting setting of an allowable differential pressure corresponding to the coefficient of friction only in a state in which the road surface has a high coefficient of friction and is not a split road.

In accordance with the third aspect of the present invention, permission/prohibition of differential pressure control, by means of the allowable differential pressure corresponding to the coefficient of friction of the road surface, at least for the wheel brakes for the left and right rear wheels is determined based on the lock hydraulic pressure of the wheel brakes for the front wheels, and it is possible to reliably and quickly carry out permission/prohibition of differential pressure control, particularly for the rear wheels.

Moreover, in accordance with the fourth aspect of the present invention, although there is a possibility of the lock hydraulic pressure overshooting due to the brake hydraulic pressure overshooting in the first cycle of anti-lock brake control, since acquisition of lock hydraulic pressure is started when starting to increase pressure in the first cycle of anti-lock brake control, it is possible to acquire a correct lock hydraulic pressure.

EXPLANATION OF REFERENCE NUMERALS AND SYMBOLS

12 Hydraulic pressure adjustment unit
27 Allowable differential pressure setting means
29 Hydraulic pressure acquisition means
BA, BB, BC, BD Wheel brakes
WA, WB Front wheels
WC, WD Rear wheels

MODES FOR CARRYING OUT THE INVENTION

A mode for carrying out the present invention is explained by reference to the attached FIG. 1 to FIG. 10.

First Embodiment

Figure 1:
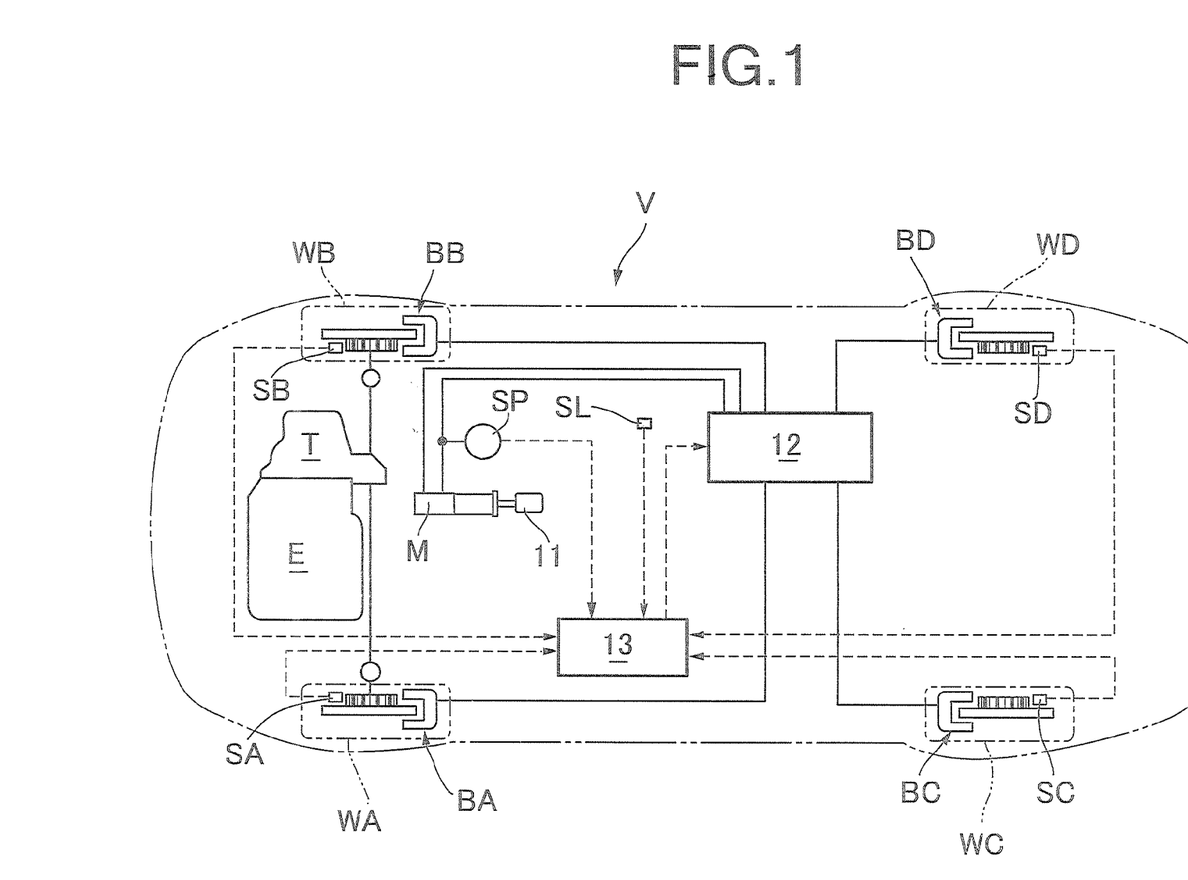
FIG. 1 is a diagram showing a brake hydraulic pressure control system for a vehicle. (first embodiment)

First, in FIG. 1, this vehicle V includes left and right coaxial front wheels WA and WB to which the driving force of an engine E is transmitted via a transmission T, and left and right coaxial rear wheels WC and WD, a brake pedal 11 operated by a driver being connected to a master cylinder M. Furthermore, the front wheels WA and WB and the rear wheels WC and WD are provided with wheel brakes BA, BB, BC, and BD operated by the action of brake hydraulic pressure, the master cylinder M being connected to each of the wheel brakes BA to BD via a hydraulic pressure adjustment unit 12. This hydraulic pressure adjustment unit 12 can individually carry out adjustment involving increasing/decreasing the brake hydraulic pressures applied to the wheel brakes BA to BD in order to prevent the wheels from attaining a locked state when braking.

Operation of the hydraulic pressure adjustment unit 12 is controlled by a hydraulic pressure control device 13. Inputted into this hydraulic pressure control device 13 are signals from wheel speed sensors SA, SB, SC, and SD individually attached to the left and right front wheels WA and WB and the left and right rear wheels WC and WD, a signal from a pressure sensor SP for detecting a brake pressure outputted from the master cylinder M, and a signal from a lateral acceleration sensor SL for detecting a lateral acceleration acting on the vehicle V, the hydraulic pressure control device 13 controlling operation of the hydraulic pressure adjustment unit 12 based on the signals from the sensors SA to SD, SP, and SL.

Figure 2:
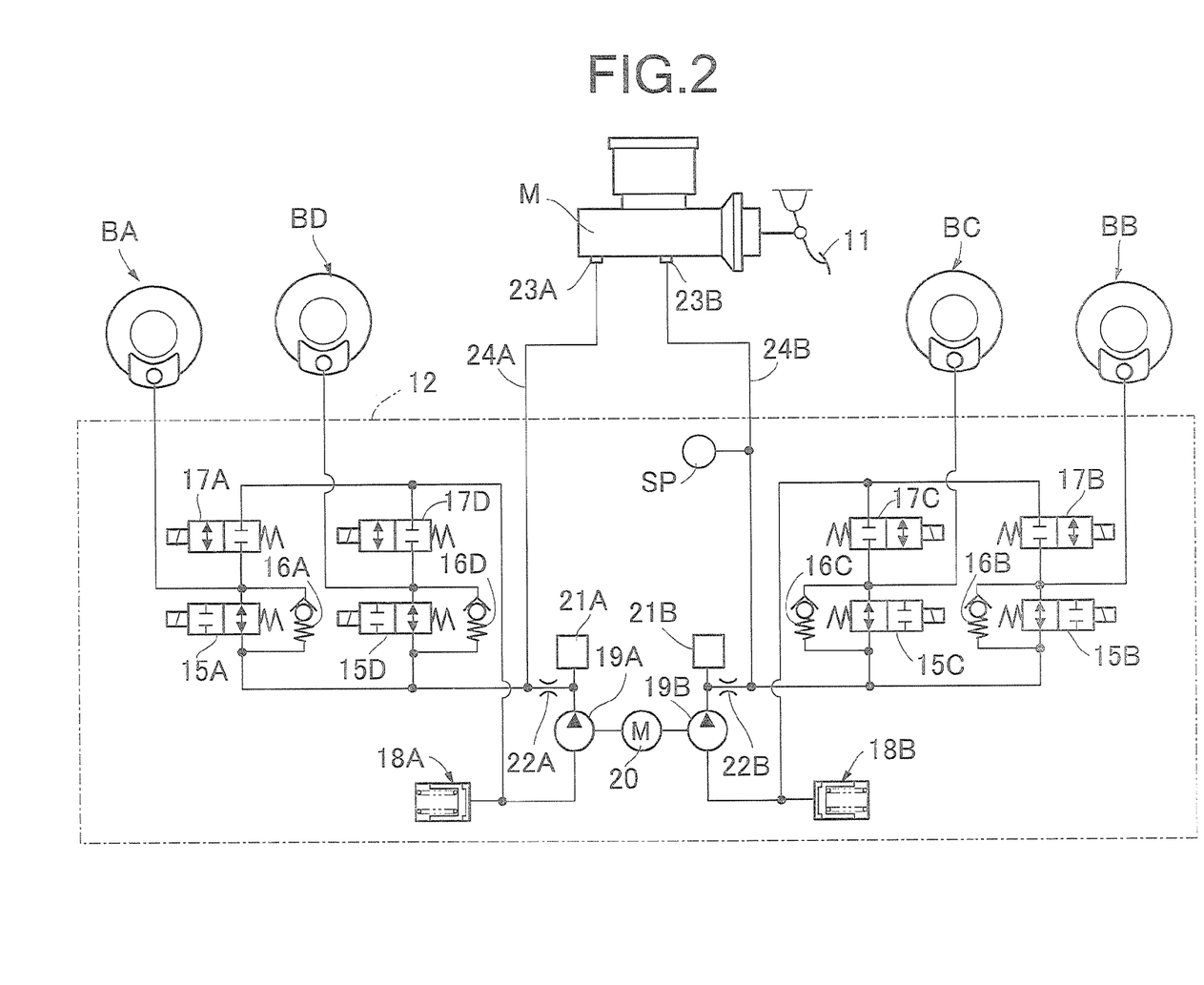
FIG. 2 is a hydraulic pressure circuit diagram showing the arrangement of a hydraulic pressure adjustment unit. (first embodiment)

In FIG. 2, the hydraulic pressure adjustment unit 12 includes normally open solenoid valves 15A to 15D individually corresponding to the wheel brake BA for the left front wheel WA, the wheel brake BB for the right front wheel WB, the wheel brake BC for the left rear wheel WC, and the wheel brake BD for the right rear wheel WD, check valves 16A to 16D connected in parallel to the normally open solenoid valves 15A to 15D respectively, normally closed solenoid valves 17A to 17D individually corresponding to the respective wheel brakes BA to BD, a first reservoir 18A corresponding to a first output hydraulic pressure path 24A communicating with, of first and second output ports 23A and 23B of the master cylinder M, the first output port 23A, a second reservoir 18B corresponding to a second output hydraulic pressure path 24B communicating with the second output port 23B of the master cylinder M, first and second pumps 19A and 19B having their intake sides connected to the first and second reservoirs 18A and 18B respectively and their discharge sides connected to the first and second output hydraulic pressure paths 24A and 24B respectively, one common electric motor 20 for driving both the pumps 19A and 19B, first and second dampers 21A and 21B to which the discharge sides of the first and second pumps 19A and 19B are respectively connected, and first and second orifices 22A and 22B provided respectively between the dampers 21A and 21B and the master cylinder M, the pressure sensor SP being connected to one of the first and second output hydraulic pressure paths 24A and 24B, for example, the second output hydraulic pressure path 24B.

The normally open solenoid valves 15A and 15D are provided between the first output hydraulic pressure path 24A and the wheel brake BA for the left front wheel WA and wheel brake BD for the right rear wheel WD, and the normally open solenoid valves 15B and 15C are provided between the second output hydraulic pressure path 24B and the wheel brake BB for the right front wheel WB and wheel brake BC for the left rear wheel WC.

Furthermore, the check valves 16A to 16D are connected in parallel to the respective normally open solenoid valves 15A to 15D so as to allow the flow of brake fluid from the corresponding wheel brake BA to BD to the master cylinder M.

The normally closed solenoid valves 17A and 17D are provided between the wheel brake BA for the left front wheel WA and wheel brake BD for the right rear wheel WD and the first reservoir 18A, and the normally closed solenoid valves 17B and 17C are provided between the wheel brake BB for the right front wheel WB and wheel brake BC for the left rear wheel WC and the second reservoir 18B.

Such a hydraulic pressure adjustment unit 12 provides communication between the master cylinder M and the wheel brakes BA to BD and cuts off the wheel brakes BA to BD from the first and second reservoirs 18A and 18B at a time of normal braking when there is no possibility of the wheels becoming locked. That is, the normally open solenoid valves 15A to 15D are de-energized and opened and the normally closed solenoid valves 17A to 17D are de-energized and closed, the brake hydraulic pressure outputted from the first output port 23A of the master cylinder M acts on the wheel brake BA for the left front wheel WA via the normally open solenoid valve 15A and acts on the wheel brake BD for the right rear wheel WD via the normally open solenoid valve 15D. Furthermore, the brake hydraulic pressure outputted from the second output port 23B of the master cylinder M acts on the wheel brake BB for the right front wheel WB via the normally open solenoid valve 15B and acts on the wheel brake BC for the left rear wheel WC via the normally open solenoid valve 15C.

When a wheel is about to enter a locked state during this braking, the hydraulic pressure adjustment unit 12 cuts off the master cylinder M from the wheel brakes BA to BD and provides communication between the wheel brakes BA to BD and the reservoirs 18A and 18B for a portion corresponding to the wheel. That is, among the normally open solenoid valves 15A to 15D, the normally open solenoid valve corresponding to the wheel that is about to enter a locked state is energized and closed, and among the normally closed solenoid valves 17A to 17D the normally closed solenoid valve corresponding to this wheel is energized and opened. This allows part of the brake hydraulic pressure for the wheel that is about to enter a locked state to be absorbed by the first reservoir 18A or the second reservoir 18B, thus decreasing the brake hydraulic pressure for the wheel that is about to enter a locked state.

Furthermore, when the brake hydraulic pressure is maintained at a constant level, the hydraulic pressure adjustment unit 12 attains a state in which the wheel brakes BA to BD are cut off from the master cylinder M and the reservoirs 18A and 18B. That is, the normally open solenoid valves 15A to 15D are energized and closed and the normally closed solenoid valves 17A to 17D are de-energized and closed. Furthermore, when increasing the brake hydraulic pressure, the normally open solenoid valves 15A to 15D may be de-energized and opened and the normally closed solenoid valves 17A to 17D may be de-energized and closed.

Controlling in this way the de-energization/energization of the normally open solenoid valves 15A to 15D and the normally closed solenoid valves 17A to 17D enables braking to be carried out efficiently without the wheels locking.

Since, during such anti-lock brake control, the electric motor 20 is operated rotationally, and the first and second pumps 19A and 19B are driven accompanying operation of the electric motor 20, the brake fluid absorbed by the first and second reservoirs 18A and 18B is taken up by the first and second pumps 19A and 19B and then returns to the first and second output hydraulic pressure paths 24A and 24B via the first and second dampers 21A and 21B. Due to such circulation of the brake fluid, the brake fluid can be returned to the master cylinder M side. Moreover, pulsation of the discharge pressure of the first and second pumps 19A and 19B is inhibited by the function of the first and second dampers 21A and 21B and the first and second orifices 22A and 22B, and the above circulation does not interfere with the operational feel of the brake pedal 11.

Figure 3:
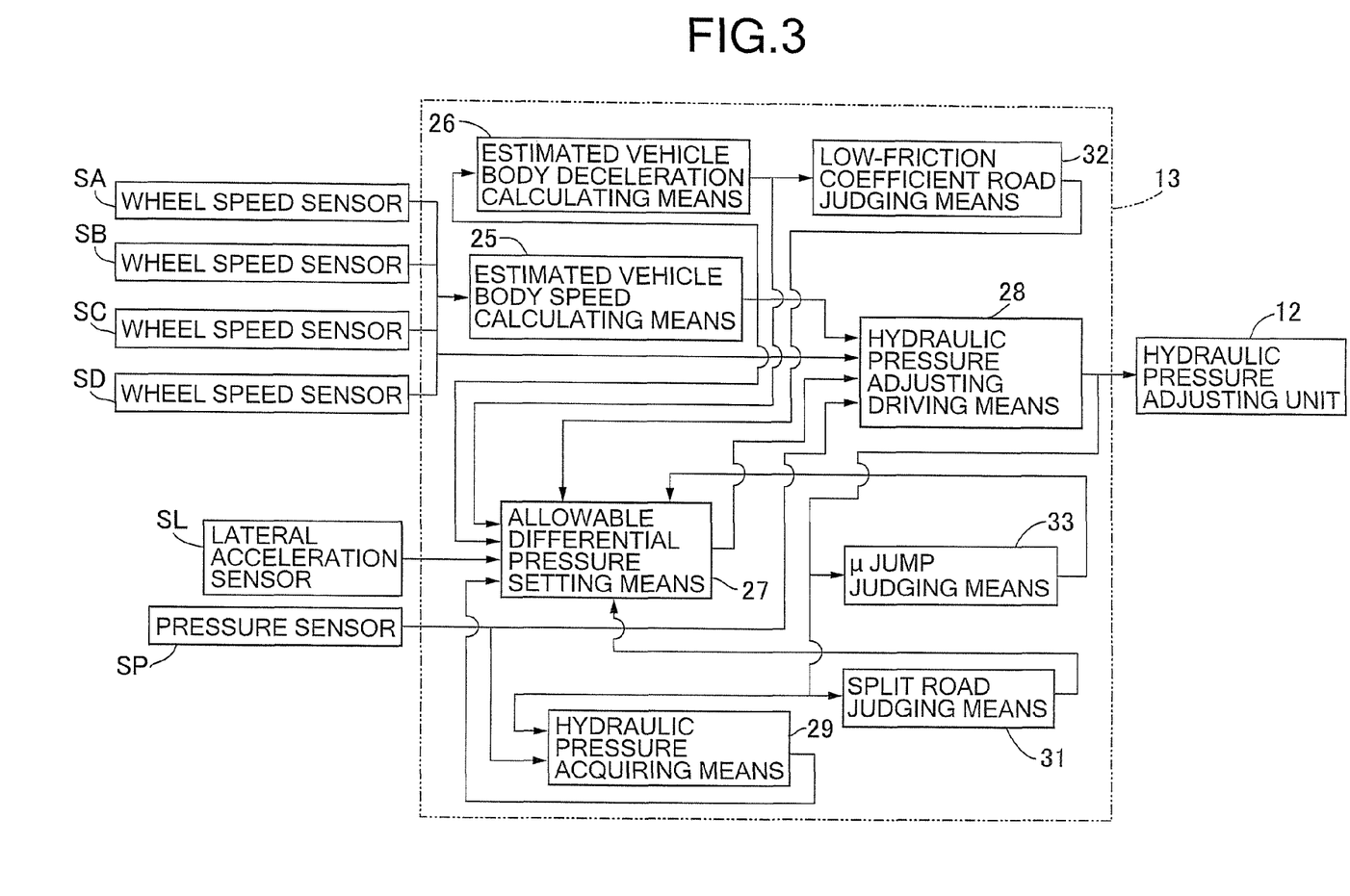
FIG. 3 is a block diagram showing the arrangement of a brake hydraulic pressure control device for a vehicle. (first embodiment)

In FIG. 3, the hydraulic pressure control device 13 for controlling the operation of the hydraulic pressure adjustment unit 12 carries out the above anti-lock brake control and, in addition, can carry out differential pressure control, which controls the difference between the brake hydraulic pressures of the wheel brakes BA and BB for the left and right front wheels WA and WB, which are coaxial, and the wheel brakes BC and BD for left and right rear wheels WC and WD, which are coaxial, so as to be within an allowable differential pressure. In order to carry out this differential pressure control, the hydraulic pressure control device 13 includes estimated vehicle body speed calculation means 25 that calculates an estimated vehicle body speed from a wheel speed obtained by the wheel speed sensors SA to SD, estimated vehicle body deceleration calculation means 26 that calculates an estimated vehicle body deceleration based on the estimated vehicle body speed calculated by the estimated vehicle body speed calculation means 25, allowable differential pressure setting means 27 that sets an allowable differential pressure between the brake hydraulic pressures of the wheel brakes BA and BB; BC and BD for the coaxial left and right front wheels WA and WB and rear wheels WC and WD, hydraulic pressure adjustment drive means 28 that operates the hydraulic pressure adjustment unit 12 by determining a control amount based on the allowable differential pressure set by the allowable differential pressure setting means 27, the output hydraulic pressure of the master cylinder M detected by the pressure sensor SP, the wheel speed obtained by the wheel speed sensors SA to SD, and the estimated vehicle body speed calculated by the estimated vehicle body speed calculation means 25, hydraulic pressure acquisition means 29 that acquires, based on an output from the hydraulic pressure adjustment drive means 28 and a signal from the pressure sensor SP, a wheel brake hydraulic pressure for the other wheel that is coaxial with the control target wheel, a lock hydraulic pressure, which is the hydraulic pressure when starting pressure decrease accompanying anti-lock brake control of the wheel brake for the other wheel, which is coaxial with the control target wheel, and the lock hydraulic pressure of the wheel brakes BA and BB for the left and right front wheels WA and WB, split road determination means 31 that determines based on an output from the hydraulic pressure adjustment drive means 28 whether or not there is a split road, on which coefficients of friction of the road surfaces with which the left and right wheels WA and WB; WC and WD are in contact are greatly different, low coefficient of friction road determination means 32 that determines, based on the estimated vehicle body deceleration obtained by the estimated vehicle body deceleration calculation means 26, whether or not there is a road surface having a low coefficient of friction, on which the coefficient of friction of the road surface is lower than a predetermined coefficient of friction, and μ jump determination means 33 that determines, based on an output from the hydraulic pressure adjustment drive means 28, whether or not there is a μ jump state, in which the coefficient of friction of the road surface on which the vehicle is traveling changes from a high coefficient of friction to a low coefficient of friction by a predetermined value or greater.

Figure 4:
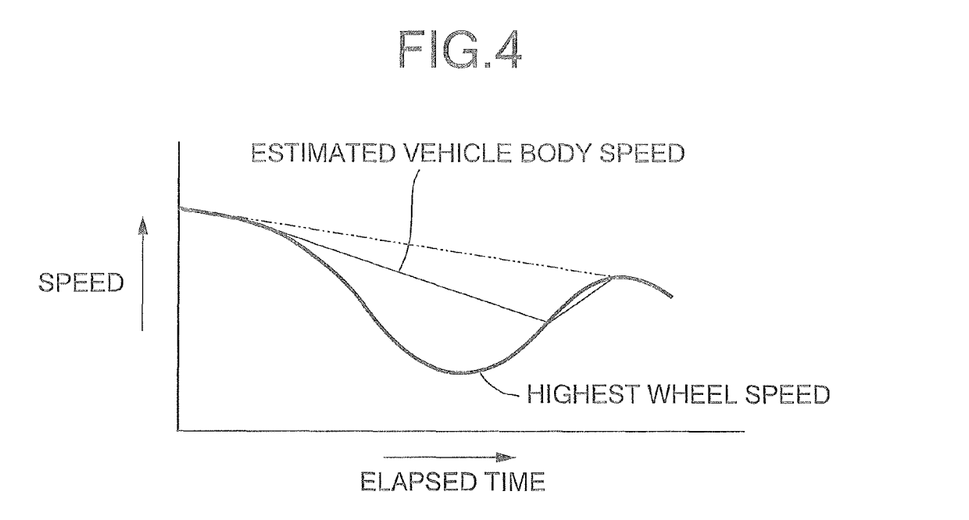
FIG. 4 is a diagram for explaining calculation of estimated vehicle body speed. (first embodiment)

The estimated vehicle body speed calculation means 25 calculates the estimated vehicle body speed based on, for example, the highest wheel speed, which is the largest value among wheel speeds obtained by the wheel speed sensors SA to SD. When the highest wheel speed changes as shown in FIG. 4, the highest wheel speed is corrected with a predetermined acceleration and deceleration to thus obtain an estimated vehicle body speed in which the maximum acceleration and the maximum deceleration are the predetermined acceleration and deceleration. The estimated vehicle body deceleration calculation means 26 calculates the estimated vehicle body deceleration as the inclination of a straight line joining peak values for the estimated vehicle body speed as shown by the chain line in FIG. 4.

The hydraulic pressure acquisition means 29 acquires the lock hydraulic pressure and the wheel brake hydraulic pressure of the other wheel, which is coaxial with the control target wheel, based on the output hydraulic pressure of the master cylinder M, which is shared by the plurality of wheel brakes BA to BD, and drive currents of the solenoid valves forming part of the hydraulic pressure adjustment unit 12, that is, the normally open solenoid valves 15A to 15D and the normally closed solenoid valves 17A to 17D. The output hydraulic pressure of the master cylinder M is inputted from the pressure sensor SP into the hydraulic pressure acquisition means 29, and a signal representative of the drive currents of the normally open solenoid valves 15A to 15D and the normally closed solenoid valves 17A to 17D is inputted from the hydraulic pressure adjustment drive means 28 into the hydraulic pressure acquisition means 29.

The allowable differential pressure setting means 27 sets an allowable differential pressure by selecting the maximum among a vehicle body speed component determined according to the estimated vehicle body speed, a lateral acceleration component determined according to the lateral acceleration, and a coefficient of friction component determined according to the coefficient of friction of the road surface on which the vehicle is traveling. The estimated vehicle body speed obtained by the estimated vehicle body speed calculation means 25, the estimated vehicle body deceleration obtained by the estimated vehicle body deceleration calculation means 26, the lateral acceleration obtained by the lateral acceleration sensor SL, the lock hydraulic pressure obtained by the hydraulic pressure acquisition means 29, and the hydraulic pressure of the coaxial wheel obtained by the hydraulic pressure acquisition means 29 are inputted into the allowable differential pressure setting means 27.

Figure 5:
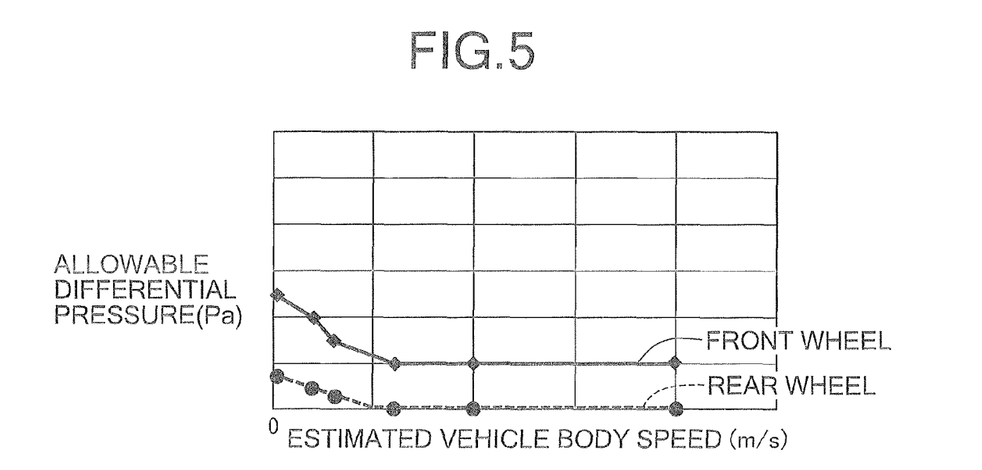
FIG. 5 is a map showing the relationship between estimated vehicle body speed and allowable differential pressure. (first embodiment)
Figure 6:
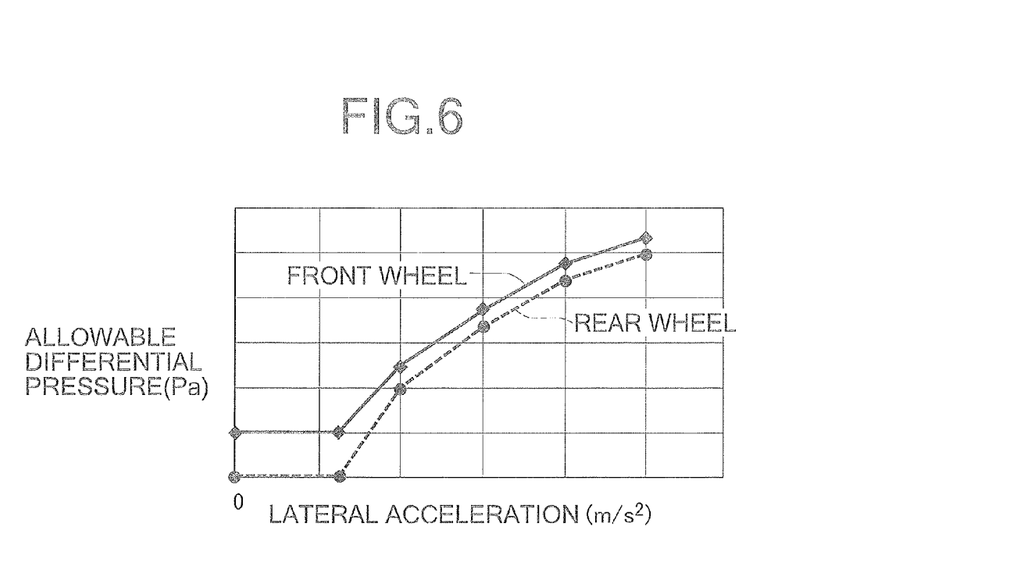
FIG. 6 is a map showing the relationship between lateral acceleration and allowable differential pressure. (first embodiment)

Thus, the allowable differential pressure setting means 27 has a map in which an allowable differential pressure is set for each of the front wheels and the rear wheels according to estimated vehicle body speed based on experiment, simulation, etc., as shown in FIG. 5, as a vehicle body speed component determined according to the estimated vehicle body speed calculated by the estimated vehicle body speed calculation means 25, as well as a map in which an allowable differential pressure is set for each of the front wheels and the rear wheels according to lateral acceleration based on experiment, simulation, etc., as shown in FIG. 6, as a lateral acceleration component determined according to the lateral acceleration detected by the lateral acceleration sensor SL.

Figure 7:
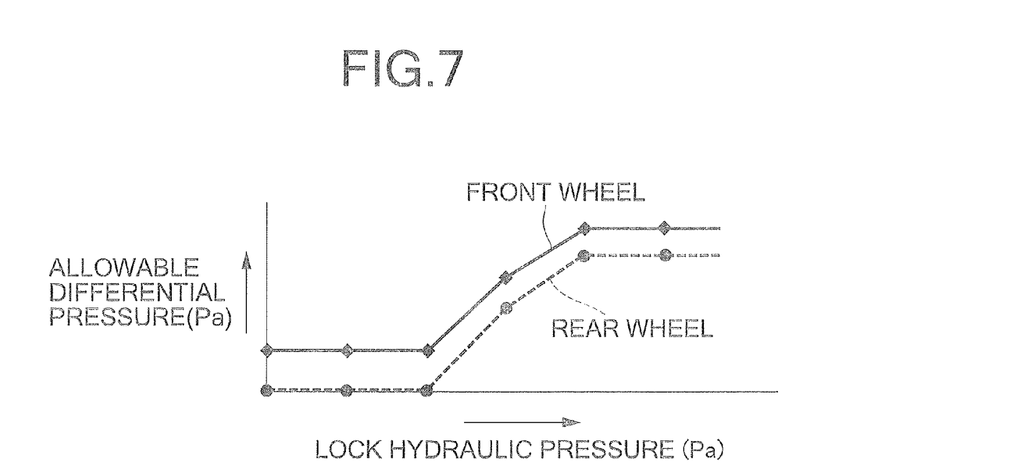
FIG. 7 is a map showing the relationship between lock hydraulic pressure and allowable differential pressure. (first embodiment)
Figure 8:
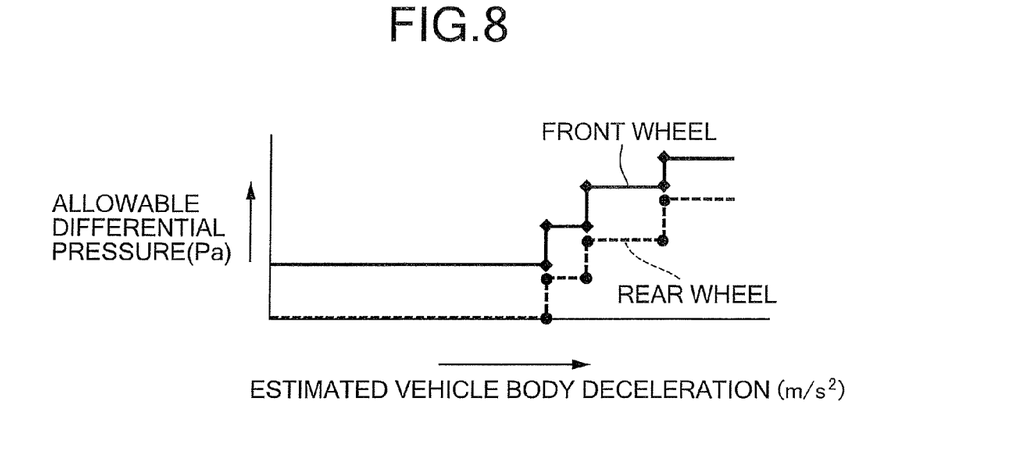
FIG. 8 is a map showing the relationship between estimated vehicle body deceleration and allowable differential pressure. (first embodiment)

Furthermore, the allowable differential pressure setting means 27 sets the coefficient of friction component by selecting the larger among a lock hydraulic pressure component and an estimated vehicle body deceleration component as a coefficient of friction component determined according to the coefficient of friction of the road surface on which the vehicle is traveling, and has a map in which, as the lock hydraulic pressure component, an allowable differential pressure is set for each of the front wheels and the rear wheels according to the lock hydraulic pressure, as shown in FIG. 7, based on experiment, simulation, etc. as well as a map in which, as the estimated vehicle body deceleration component determined according to the estimated vehicle body deceleration obtained by the estimated vehicle body deceleration calculation means 26, an allowable differential pressure is set for each of the front wheels and the rear wheels according to the estimated vehicle body deceleration, as shown in FIG. 8, based on experiment, simulation, etc. The allowable differential pressure setting means 27 sets a high select value of the allowable differential pressure obtained from these maps as the allowable differential pressure corresponding to the coefficient of friction of the road surface.

Figure 9:
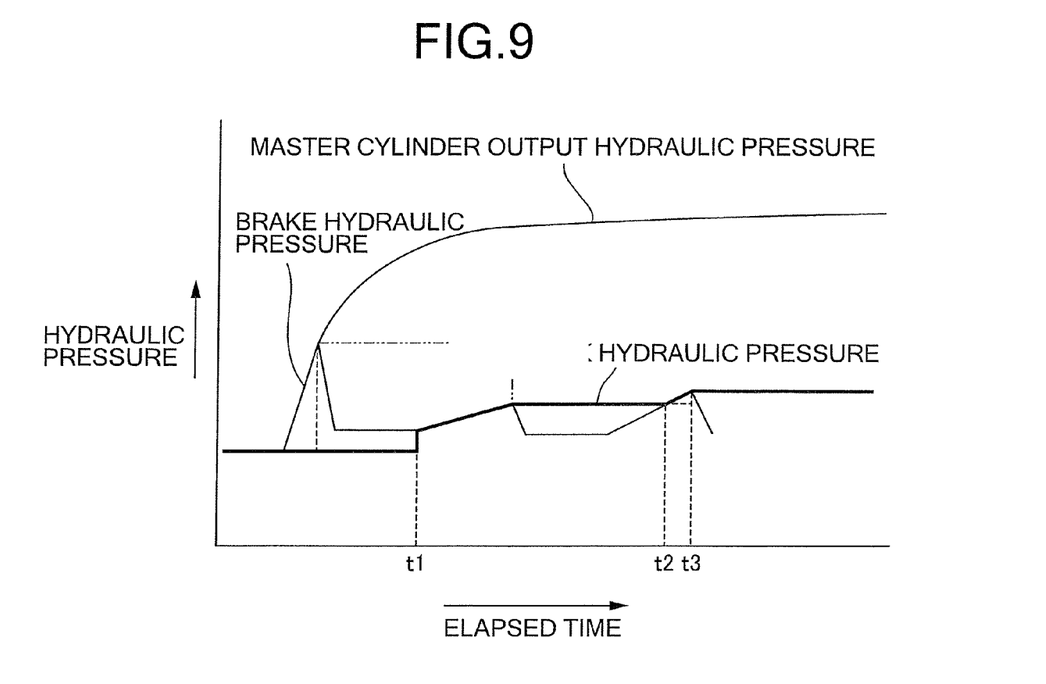
FIG. 9 is a graph showing one example of brake hydraulic pressure and lock hydraulic pressure of coaxial wheels. (first embodiment)

At a time of anti-lock brake control during sudden braking, as shown in FIG. 9, in the first cycle of anti-lock brake control, there is a possibility that the brake hydraulic pressure will overshoot and the lock hydraulic pressure will also overshoot as shown by the chain line accompanying it, and the hydraulic pressure acquisition means 29 therefore starts acquisition of the lock hydraulic pressure from a time t1, which is the time at which pressure starts increasing in the first cycle of anti-lock brake control, thereby enabling acquisition of a correct lock hydraulic pressure. The allowable differential pressure setting means 27 selects the larger among the lock hydraulic pressure obtained by the hydraulic pressure acquisition means 29 and the brake hydraulic pressure for the coaxial wheel, and during the time between times t2 and t3, where the brake hydraulic pressure for the coaxial wheel is larger than the lock hydraulic pressure, the allowable differential pressure setting means 27 employs the brake hydraulic pressure for the coaxial wheel as a lock hydraulic pressure.

Moreover, since the allowable differential pressure setting means 27 does not carry out setting of allowable differential pressure based on the lock hydraulic pressure between the pressure starting to decrease and the pressure starting to increase when starting anti-lock brake control since there is a possibility as described above of the lock hydraulic pressure overshooting during the time up to time t1 after starting anti-lock brake control, and the estimated vehicle body deceleration calculation means 26 cannot calculate with good precision, during the initial stage of anti-lock brake control, the estimated vehicle body deceleration, which is to be used for setting the allowable differential pressure corresponding to the coefficient of friction of the road surface on which the vehicle is traveling, the allowable differential pressure based on the estimated vehicle body deceleration is set after repeating at least twice a control cycle of pressure decrease, holding, and pressure increase of the brake hydraulic pressure in anti-lock brake control.

The split road determination means 31 determines that there is the split road when independent control employing the allowable differential pressure based on a signal from the hydraulic pressure adjustment drive means 28 has been carried out for either one of the left and right front wheels continuously for a predetermined time or longer, and also determines that there is the split road when the brake hydraulic pressure of the control target wheel is higher than the lock hydraulic pressure of the wheel brake for the other wheel that is coaxial with the control target wheel by a predetermined value or greater.

That is, a state in which a differential pressure occurring between the wheel brakes BA and BB for the left and right front wheels continues for a predetermined time or longer can be estimated as being one in which there is a split road, and in such a state the split road determination means 31 determines that there is a split road.

Figure 10:
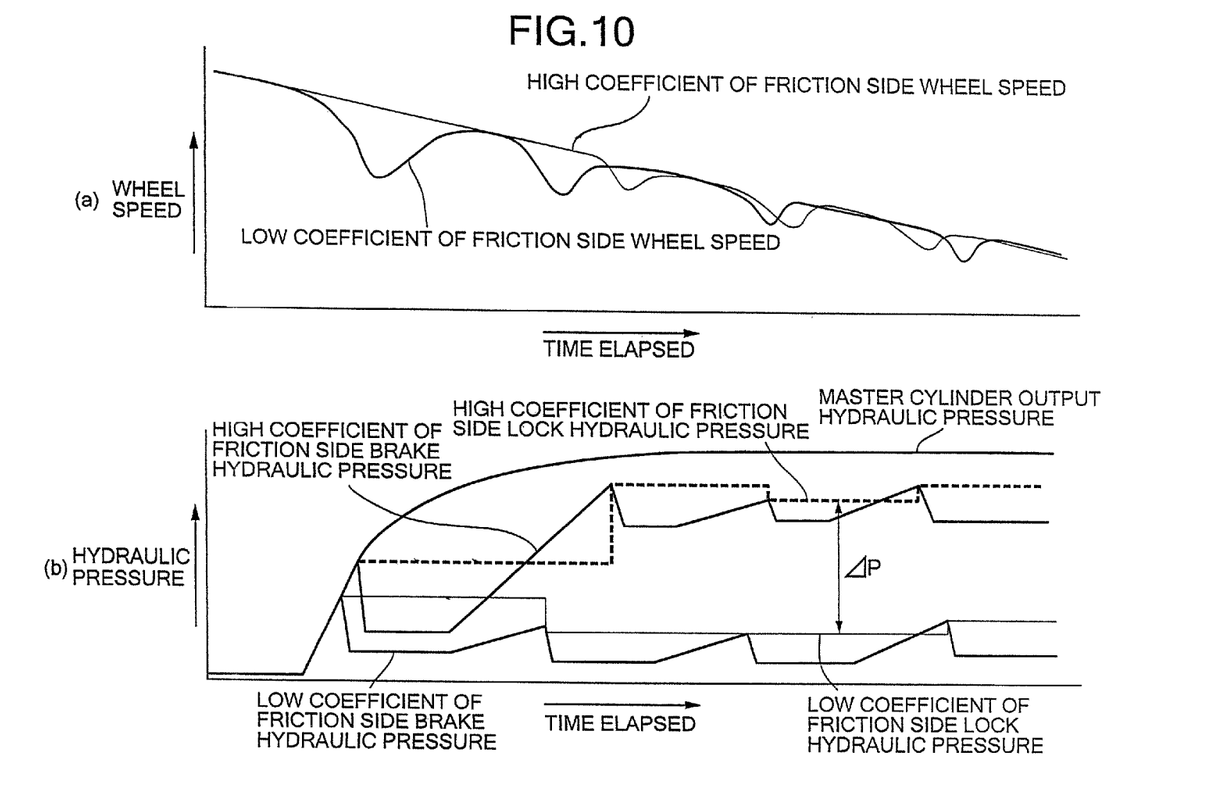
FIG. 10 is a diagram showing one example of change in wheel speed of wheels and brake hydraulic pressure of left and right wheel brakes on a split road. (first embodiment)

When the wheel speeds of the left and right front wheels change as shown in FIG. 10 (a) due to traveling on a split road, among the wheel brakes BA and BB for the left and right front wheels WA and WB, the brake hydraulic pressure and the lock hydraulic pressure on the high coefficient of friction side and the brake hydraulic pressure and the lock hydraulic pressure on the low coefficient of friction side change as shown in FIG. 10 (b), a large differential pressure occurs between the lock hydraulic pressure on the high coefficient of friction side and the lock hydraulic pressure on the low coefficient of friction side, and it becomes possible to determine that there is a split road when the brake hydraulic pressure for the control target wheel is higher than the lock hydraulic pressure of the wheel brake for the other wheel, which is coaxial with the control target wheel, by a predetermined value or greater.

Furthermore, the low coefficient of friction road determination means 32 determines that there is a low coefficient of friction road when the estimated vehicle body deceleration calculated by the estimated vehicle body deceleration calculation means 26 is lower than a defined value, and also determines that there is a low coefficient of friction when the lock hydraulic pressure of either one of the wheel brakes BA and BB for the left and right front wheels WA and WB is smaller than a predetermined value. That is, on a road surface with a low coefficient of friction, the lock hydraulic pressure becomes low as shown in FIG. 10 (b), and it is possible to determine that there is a low coefficient of friction when the lock hydraulic pressure is lower than a predetermined value.

Moreover, the μ jump determination means 33 determines that there is a μ jump state when, with regard to either one of the wheel brakes BA and BB for the left and right front wheels WA and WB, the amount of pressure decrease in the anti-lock brake control has increased from the amount of pressure decrease in the previous cycle by a predetermined amount or greater.

When the split road determination means 31 determines that there is a split road, when the low coefficient of friction road determination means 32 determines that there is a low coefficient of friction road based on the estimated vehicle body deceleration, and when the μ jump determination means 33 determines that there is a μ jump state, application of the allowable differential pressure corresponding to the coefficient of friction of the road surface is prohibited, and in this embodiment, the allowable differential pressure setting means 27 stops the setting of an allowable differential pressure corresponding to the coefficient of friction of the road surface but sets an allowable differential pressure by selecting the larger among the vehicle body speed component determined according to the estimated vehicle body speed and the lateral acceleration component determined according to the lateral acceleration.

Furthermore, when the low coefficient of friction road determination means 32 determines that there is a low coefficient of friction based on the lock hydraulic pressure of the wheel brakes BA and BB for the left and right front wheels WA and WB, application of the allowable differential pressure corresponding to the coefficient of friction of the road surface at least to the wheel brakes BC and BD for the left and right rear wheels WC and WD is prohibited.

Moreover, when the lock hydraulic pressure of either one of the wheel brakes BA and BB for the left and right front wheels WA and WB acquired by the hydraulic pressure acquisition means 29 is no greater than a predetermined value that enables determination of a low coefficient of friction, application of the allowable differential pressure corresponding to the coefficient of friction of the road surface at least to the wheel brakes BC and BD for the rear wheels WC and WD is prohibited.

The operation of this embodiment is now explained. The allowable differential pressure setting means 27 sets an allowable differential pressure by selecting the maximum among the vehicle body speed component determined according to the estimated vehicle body speed, the lateral acceleration component determined according to the lateral acceleration, and the coefficient of friction component determined according to the coefficient of friction of the road surface on which the vehicle is traveling. The allowable differential pressure corresponding to the coefficient of friction of the road surface is determined by selecting the larger value among the estimated vehicle body deceleration component and the lock hydraulic pressure component. With regard to the estimated vehicle body deceleration component, the allowable differential pressure corresponding to the coefficient of friction of the road surface is set based on the estimated vehicle body deceleration calculated by the estimated vehicle body deceleration calculation means 26, and with regard to the lock hydraulic pressure component, the allowable differential pressure corresponding to the coefficient of friction of the road surface is set based on the lock hydraulic pressure of the coaxial wheel acquired by the hydraulic pressure acquisition means 29.

Therefore, when an allowable differential pressure corresponding to the coefficient of friction of the road surface is set based on the estimated vehicle body deceleration, compared with a conventional arrangement in which the brake hydraulic pressure for a wheel that is coaxial with a control target wheel is used as the component corresponding to the coefficient of friction of the road surface, it is possible to determine with good precision whether it is a road surface with a high coefficient of friction or a road surface with a low coefficient of friction, and for the road surface with a high coefficient of friction, which is a stable road surface for traveling on, it is possible to set a large allowable hydraulic pressure difference between the brake hydraulic pressures of the wheel brakes BA and BB for the coaxial left and right front wheels WA and WB and between the brake hydraulic pressures of the wheel brakes BC and BD for the coaxial left and right rear wheels WC and WD, thereby improving the control efficiency for left-and-right independent control.

Furthermore, when the allowable differential pressure corresponding to the coefficient of friction of the road surface is set based on the lock hydraulic pressure of the coaxial wheels, variation of the allowable differential pressure is suppressed by preventing the occurrence of hunting due to change in hydraulic pressure caused by an increase/decrease of brake hydraulic pressure during anti-lock brake control, thereby enabling an allowable differential pressure stably corresponding to the coefficient of friction of the road surface to be set.

Moreover, since the estimated vehicle body deceleration calculation means 26 calculates the estimated vehicle body deceleration based on the estimated vehicle body speed calculated by the estimated vehicle body speed calculation means 25 from the wheel speed detected by the wheel speed sensor SA, SB, SC, SD for each of the front wheels WA and WB and the rear wheels WC and WD, it is possible to calculate the estimated vehicle body deceleration with good precision without using another sensor such as an acceleration sensor.

Furthermore, the allowable differential pressure setting means 27 has a map in which the allowable differential pressure corresponding to the estimated vehicle body deceleration is set in advance and sets the allowable differential pressure corresponding to the coefficient of friction of the road surface based on the map, and it is therefore possible to easily set the allowable differential pressure so as to be a value suitable for the coefficient of friction of the road surface from the map, which is set based on experiment, simulation, etc.

Moreover, since the allowable differential pressure setting means 27 sets the allowable differential pressure based on the estimated vehicle body deceleration after repeating at least twice the control cycle of pressure decrease, holding, and pressure increase of the brake hydraulic pressure in anti-lock brake control for preventing the wheel from becoming locked, the allowable differential pressure based on the estimated vehicle body deceleration is set only in a state in which the vehicle body deceleration can be calculated with good precision, thus enabling a highly reliable allowable differential pressure to be obtained.

Furthermore, the allowable differential pressure setting means 27 sets, as the allowable differential pressure corresponding to the coefficient of friction of the road surface, the larger value among the allowable differential pressure based on the lock hydraulic pressure, which is the hydraulic pressure when starting pressure decrease accompanying anti-lock brake control of the other wheel brake that is coaxial with the control target wheel brake, and the allowable differential pressure set based on the estimated vehicle body deceleration, thus enabling an allowable differential pressure corresponding with higher precision to the coefficient of friction on the road surface on which the vehicle is traveling to be obtained.

Moreover, since the hydraulic pressure acquisition means 29 calculates the lock hydraulic pressure based on the output hydraulic pressure of the master cylinder M, which is shared by the plurality of wheel brakes BA BB, BC, and BD, and the drive current for the normally open solenoid valves 15A, 15B, 15C, and 15D and the normally closed solenoid valves 17A, 17B, 17C, and 17D, which form part of the hydraulic pressure adjustment unit 12, it is possible to appropriately acquire the lock hydraulic pressure without using a sensor, etc.

Furthermore, since the allowable differential pressure setting means 27 has a map in which the allowable differential pressure corresponding to the lock hydraulic pressure is set in advance and sets the allowable differential pressure corresponding to the coefficient of friction of the road surface based on the map, it is possible to easily set the allowable differential pressure so as to be a value suitable for the coefficient of friction of the road surface from the map, which is set based on experiment, simulation, etc.

Since the hydraulic pressure acquisition means 29 acquires the hydraulic pressure of the wheel brake for the other wheel that is coaxial with the control target wheel, and the allowable differential pressure setting means 27 sets the allowable differential pressure corresponding the coefficient of friction of the road surface based on the larger hydraulic pressure between the lock hydraulic pressure acquired by the hydraulic pressure acquisition means 29 and the hydraulic pressure of the wheel brake for the other wheel that is coaxial with the control target wheel, even when the brake hydraulic pressure is increased it is possible for it to be to reflected immediately in setting of the allowable differential pressure, and it is possible to set an allowable differential pressure corresponding to the coefficient of friction of the road surface with higher precision.

Moreover, since the allowable differential pressure setting means 27 sets the allowable differential pressure based on the lock hydraulic pressure during a period excluding that between the start of pressure decrease and the start of pressure increase when starting anti-lock brake control, during the period, in which there is a possibility of the lock hydraulic pressure overshooting accompanying sudden braking, the allowable differential pressure based on the lock hydraulic pressure is not set, thereby enhancing the reliability.

Since whether or not there is a split road, in which the coefficients of friction of the road surfaces with which the left and right wheels are in contact are greatly different, is determined by the split road determination means 31, whether or not there is a road surface with a low coefficient of friction, for which the coefficient of friction of the road surface is lower than the predetermined coefficient of friction, is determined by the low coefficient of friction road determination means 32, and when there is either a state in which the result determined by the split road determination means 31 is that there is a split road or a state in which the result determined by the low coefficient of friction road determination means 32 is that there is a low coefficient of friction road, application of the allowable differential pressure corresponding to the coefficient of friction of the road surface is prohibited, the allowable differential pressure between the brake hydraulic pressures of the wheel brakes BA and BB; BC and BD for the coaxial left and right front wheels WA and WB and rear wheels WC and WD is set so as to correspond to the coefficient of friction of the road surface in a state in which the state of travel of the vehicle is stable while traveling on a road surface that is not a split road or does not have a low coefficient of friction, thus enabling an appropriate allowable differential pressure to be set according to the state of the road surface.

Since the split road determination means 31 determines that there is a split road when independent control employing the allowable differential pressure has been carried out for either of the left and right front wheels for a predetermined time or longer and also determines that there is a split road when the brake hydraulic pressure for the control target wheel is higher by a predetermined value or greater than the lock hydraulic pressure, which is the hydraulic pressure when starting to decrease pressure accompanying anti-lock brake control for the wheel brake of the other wheel that is coaxial with the control target wheel, it is possible to appropriately determine that there is a split road, and setting of the allowable differential pressure corresponding to the coefficient of friction of the road surface while traveling on a split road is stopped, thus ensuring the behavioral stability of the vehicle.

Since the low coefficient of friction road determination means 32 determines that it is a low coefficient of friction road when the estimated vehicle body deceleration calculated by the estimated vehicle body deceleration calculation means 26 is lower than a defined value, it is possible to appropriately determine that there is a low coefficient of friction road, thereby ensuring the behavioral stability of the vehicle.

Furthermore, since the μ jump determination means 33 determines that there is a μ jump state, in which the coefficient of friction of the road surface on which the vehicle is traveling changes from a high coefficient of friction to the low coefficient of friction side by a predetermined value or greater, and the allowable differential pressure setting means 27 prohibits application of an allowable differential pressure corresponding to the coefficient of friction of the road surface when the result determined by the μ jump determination means 33 is that there is a μ jump state, it is possible to prevent the behavioral stability of the vehicle from being impaired due to an allowable differential pressure corresponding to the coefficient of friction of the road surface being set in a μ jump state, thus.

Moreover, since the hydraulic pressure acquisition means 29 acquires the lock hydraulic pressure, which is the hydraulic pressure when starting anti-lock brake control of the wheel brakes BA and BB for the front wheels WA and WB, and application of an allowable differential pressure corresponding to the coefficient of friction of the road surface is prohibited when the lock hydraulic pressure of the wheel brakes BA and BB for the front wheels WA and WB acquired by the hydraulic pressure acquisition means 29 is no greater than a predetermined value for which the low coefficient of friction can be determined, it is possible to appropriately set an allowable differential pressure corresponding to the state of the road surface by not setting an allowable differential pressure corresponding to the coefficient of friction of the road surface for a road surface with a low coefficient of friction.

Furthermore, since, when the lock hydraulic pressure of either of the wheel brakes BA and BB for the left and right front wheels WA and WB acquired by the hydraulic pressure acquisition means 29 is the predetermined value or below, application of an allowable differential pressure corresponding to the coefficient of friction of the road surface is prohibited, this enables the arrangement to be such that, other than a state in which both road surfaces with which the left and right front wheels WA and WB are in contact have a high coefficient of friction, an allowable differential pressure corresponding to the coefficient of friction of the road surface is not applied, and setting of the allowable differential pressure corresponding to the coefficient of friction is permitted only in a state in which the road surface has a high coefficient of friction and the road is not a split road.

Moreover, since the allowable differential pressure setting means 27 prohibits, based on the lock hydraulic pressure of the wheel brakes BA and BB for the front wheels WA and WB, application of an allowable differential pressure corresponding to the coefficient of friction of the road surface at least to the wheel brakes BC and BD for the rear wheels WC and WD, permission/prohibition of differential pressure control, by means of the allowable differential pressure corresponding to the coefficient of friction of the road surface, for at least the wheel brakes BC and BD for the left and right rear wheels WC and WD is determined based on the lock hydraulic pressure of the wheel brakes BA and BB for the front wheels WA and WB, and it is possible to reliably and quickly carry out permission/prohibition of differential pressure control for the rear wheels WC and WD in particular.

A mode for carrying out the present invention is explained above, but the present invention is not limited to the above embodiment and may be modified in a variety of ways as long as the modifications do not depart from the spirit and scope thereof.

The invention claimed is:

1. A brake hydraulic pressure control device for a vehicle, the control device comprising:
   an anti-lock hydraulic pressure adjustment unit that is configured to carry out adjustment involving individually adjusted brake hydraulic pressures applied to wheel brakes for front wheels and wheel brakes for rear wheels of the vehicle, in order to prevent the front wheels and the rear wheels from attaining a locked state when braking;
   allowable differential pressure setting means that sets a first allowable differential pressure between the brake hydraulic pressures of the wheel brakes for the left and right front wheels and a second allowable differential pressure between the brake hydraulic pressures of the wheel brakes for the left and right rear wheels, operation of the anti-lock hydraulic pressure adjustment unit being controlled so that a maximum applied differential pressure between brake hydraulic pressures of the left and right wheel brakes for at least one of the front wheels and the rear wheels is no greater than the first or second allowable differential pressure that is set by the allowable differential pressure setting means; and
   hydraulic pressure acquisition means that acquires a lock hydraulic pressure, which is a hydraulic pressure sensed by a pressure sensor when starting anti-lock brake control for a respective wheel brake,
   wherein the allowable differential pressure setting means sets the first and second allowable differential pressures by selecting a maximum among three components including a vehicle body speed component, determined according to an estimated vehicle body speed, a lateral acceleration component determined according to a lateral acceleration sensed by a lateral acceleration sensor, and a coefficient of friction component determined according to a coefficient of friction of a road surface on which the vehicle is traveling, the coefficient of friction determined based on sensed values of the lock hydraulic pressures of the wheel brakes for the front wheels,
   wherein during normal operating conditions, the allowable differential pressure setting means selectively sets the first allowable differential pressure so as to correspond to a coefficient of friction of the road surface on which the vehicle is traveling, and
   wherein, during low-friction conditions, when the lock hydraulic pressure of either of the wheel brakes for the front wheels acquired by the hydraulic pressure acquisition means is no greater than a predetermined value which corresponds to a low coefficient of friction, the allowable differential pressure setting means sets the first allowable differential pressure by selecting a larger value between the vehicle body speed component and the lateral acceleration component.

2. The brake hydraulic pressure control device for a vehicle according to claim 1, wherein when the lock hydraulic pressure of the wheel brake for either one of the left and right front wheels acquired by the hydraulic pressure acquisition means is no greater than the predetermined value, the allowable differential pressure setting means is prohibited from setting said first allowable differential pressure to correspond to the coefficient of friction of the road surface.

3. The brake hydraulic pressure control device for a vehicle according to claim 1, wherein the allowable differential pressure setting means is prohibited from setting said first or second allowable differential pressure to correspond to the coefficient of friction of the road surface at least to the wheel brakes for the rear wheels based on the lock hydraulic pressures of the wheel brakes for the front wheels acquired by the hydraulic pressure acquisition means.

4. The brake hydraulic pressure control device for a vehicle according to claim 1, wherein the hydraulic pressure acquisition means starts acquisition of lock hydraulic pressure when starting to increase pressure in a first cycle of an anti-lock brake control operation.

5. A brake hydraulic pressure control device for a vehicle, the control device comprising:
an anti-lock hydraulic pressure adjustment unit that is configured to carry out adjustment involving individually adjusted brake hydraulic pressures applied to wheel brakes for front wheels and wheel brakes for rear wheels in order to prevent the front wheels and the rear wheels from attaining a locked state when braking;
allowable differential pressure setting means that sets a first allowable differential pressure between the brake hydraulic pressures of the wheel brakes for the left and right front wheels and a second allowable differential pressure between the brake hydraulic pressures of the wheel brakes for the left and right rear wheels, operation of the anti-lock hydraulic pressure adjustment unit being controlled so that a maximum applied differential pressure between brake hydraulic pressures of the left and right wheel brakes for at least one of the front wheels and the rear wheels is no greater than the first or second allowable differential pressure that is set by the allowable differential pressure setting means; and
hydraulic pressure acquisition means that acquires a lock hydraulic pressure, which is a hydraulic pressure sensed by a pressure sensor when starting anti-lock brake control for a respective wheel brake,
wherein the allowable differential pressure setting means sets the first and second allowable differential pressures by selecting a maximum among three components including a vehicle body speed component, determined according to an estimated vehicle body speed, a lateral acceleration component determined according to a lateral acceleration sensed by a lateral acceleration sensor, and a coefficient of friction component determined according to a coefficient of friction of a road surface on which the vehicle is traveling, the coefficient of friction determined based on sensed values of the lock hydraulic pressures of the wheel brakes for the front wheels,
wherein during normal operating conditions, the allowable differential pressure setting means selectively sets the first allowable differential pressure so as to correspond to a coefficient of friction of a road surface on which the vehicle is traveling, and
wherein, during low-friction conditions, when the lock hydraulic pressure of either of the wheel brakes for the front wheels acquired by the hydraulic pressure acquisition means is no greater than a predetermined value which corresponds to a low coefficient of friction, the allowable differential pressure setting means sets the first allowable differential pressure by selecting a larger value between the vehicle body speed component and the lateral acceleration component,
and wherein said allowable differential pressure setting means includes a map which stores preset allowable differential pressure between the brake hydraulic pressures of the wheel brakes for the left and right front wheels and between the brake hydraulic pressures of the wheel brakes for the left and right rear wheels based on estimated vehicle body speed.

6. The brake hydraulic pressure control device for a vehicle according to claim 5, wherein when the lock hydraulic pressure of the wheel brake for either one of the left and right front wheels acquired by the hydraulic pressure acquisition means is no greater than the predetermined value, the allowable differential pressure setting means is prohibited from setting said first allowable differential pressure to correspond to the coefficient of friction of the road surface.

7. The brake hydraulic pressure control device for a vehicle according to claim 5, wherein the allowable differential pressure setting means is prohibited from setting said first or second allowable differential pressure to correspond to the coefficient of friction of the road surface at least to the wheel brakes for the rear wheels based on the lock hydraulic pressures of the wheel brakes for the front wheels acquired by the hydraulic pressure acquisition means.

8. The brake hydraulic pressure control device for a vehicle according to claim 5, wherein the hydraulic pressure acquisition means starts acquisition of lock hydraulic pressure when starting to increase pressure in a first cycle of an anti-lock brake control operation.

* * * * *